United States Patent [19]

Weder et al.

[11] Patent Number: 5,673,537

[45] Date of Patent: *Oct. 7, 1997

[54] METHOD FOR WRAPPING INDIVIDUAL FLORAL GROUPINGS WITH WRAPPING MATERIAL HAVING SIZING MARKS THEREON

[75] Inventors: Donald E. Weder; John W. Bergstrand, both of Highland, Ill.

[73] Assignee: Southpac Trust International, Inc., Okla. City, Okla.; not individually, but as trustee of The Family Trust U/T/A dated Dec. 8, 1995, Charles A. Codding, Authorized Signatory for Southpac Trust International Inc., trustee

[*] Notice: The term of this patent shall not extend beyond the expiration date of Pat. No. 5,501,060.

[21] Appl. No.: 465,081

[22] Filed: Jun. 5, 1995

Related U.S. Application Data

[63] Continuation of Ser. No. 239,483, May 9, 1994, Pat. No. 5,501,060, which is a continuation-in-part of Ser. No. 10,899, Jan. 29, 1993, Pat. No. 5,381,642, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 10,899, is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned.

[51] Int. Cl.$^6$ .................. B65B 11/04; B65B 11/48; B65B 25/02

[52] U.S. Cl. .................. 53/399; 53/411; 53/465; 47/72; 229/87.01

[58] Field of Search .................. 53/399, 397, 462, 53/465, 466, 411, 51; 229/87.01; 47/72; 428/317.1

[56] References Cited

U.S. PATENT DOCUMENTS

| | | | |
|---|---|---|---|
| 1,525,015 | 2/1925 | Weeks | 53/465 X |
| 2,170,147 | 8/1939 | Lane | 53/399 X |
| 2,340,373 | 2/1944 | Gardner | 47/72 X |
| 3,027,263 | 3/1962 | Wanamaker | 53/465 |
| 3,271,922 | 9/1966 | Wallerstein et al. | |
| 3,508,372 | 4/1970 | Wallerstein et al. | |
| 4,989,396 | 2/1991 | Weder et al. | 53/465 X |
| 5,007,229 | 4/1991 | Weder et al. | 53/462 X |
| 5,111,637 | 5/1992 | Weder et al. | 53/397 |
| 5,181,364 | 1/1993 | Weder | 53/465 X |
| 5,239,804 | 8/1993 | Weder et al. | 53/465 X |
| 5,245,814 | 9/1993 | Weder | 53/462 X |
| 5,307,605 | 5/1994 | Straeter | 53/397 |
| 5,335,476 | 8/1994 | Weder | 53/399 X |
| 5,381,642 | 1/1995 | Weder et al. | 53/465 X |
| 5,448,875 | 9/1995 | Weder | 53/397 |
| 5,501,060 | 3/1996 | Weder et al. | 53/399 |

*Primary Examiner*—Horace M. Culver
*Attorney, Agent, or Firm*—Dunlap & Codding, P.C.

[57] ABSTRACT

A method for wrapping a wrapping material having sizing marks thereon about a floral grouping to form a wrapper about the floral grouping, the wrapper having a perimeter length about a bloom portion of the floral grouping which is predetermined by the position of the sizing marks. The sheet of material has a bonding material disposed thereupon so that the wrapping material retains its shape and substantially surrounds and encompasses the floral grouping.

5 Claims, 2 Drawing Sheets

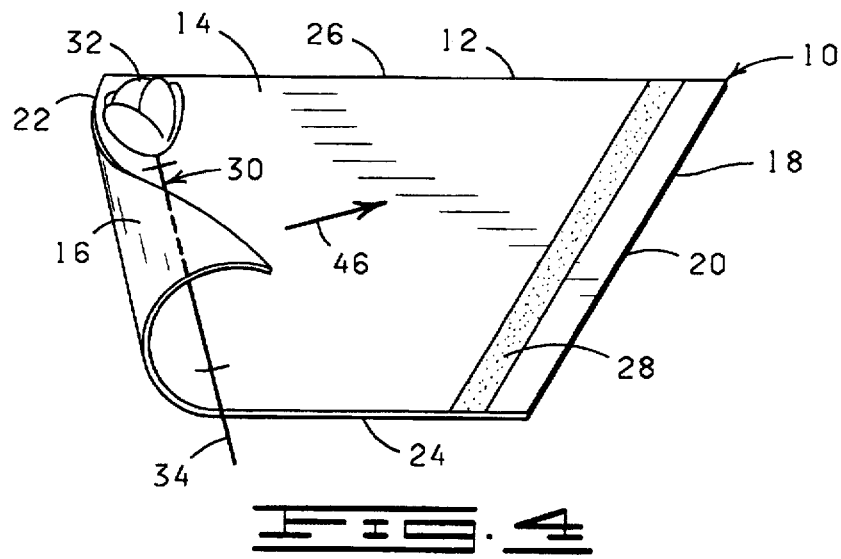
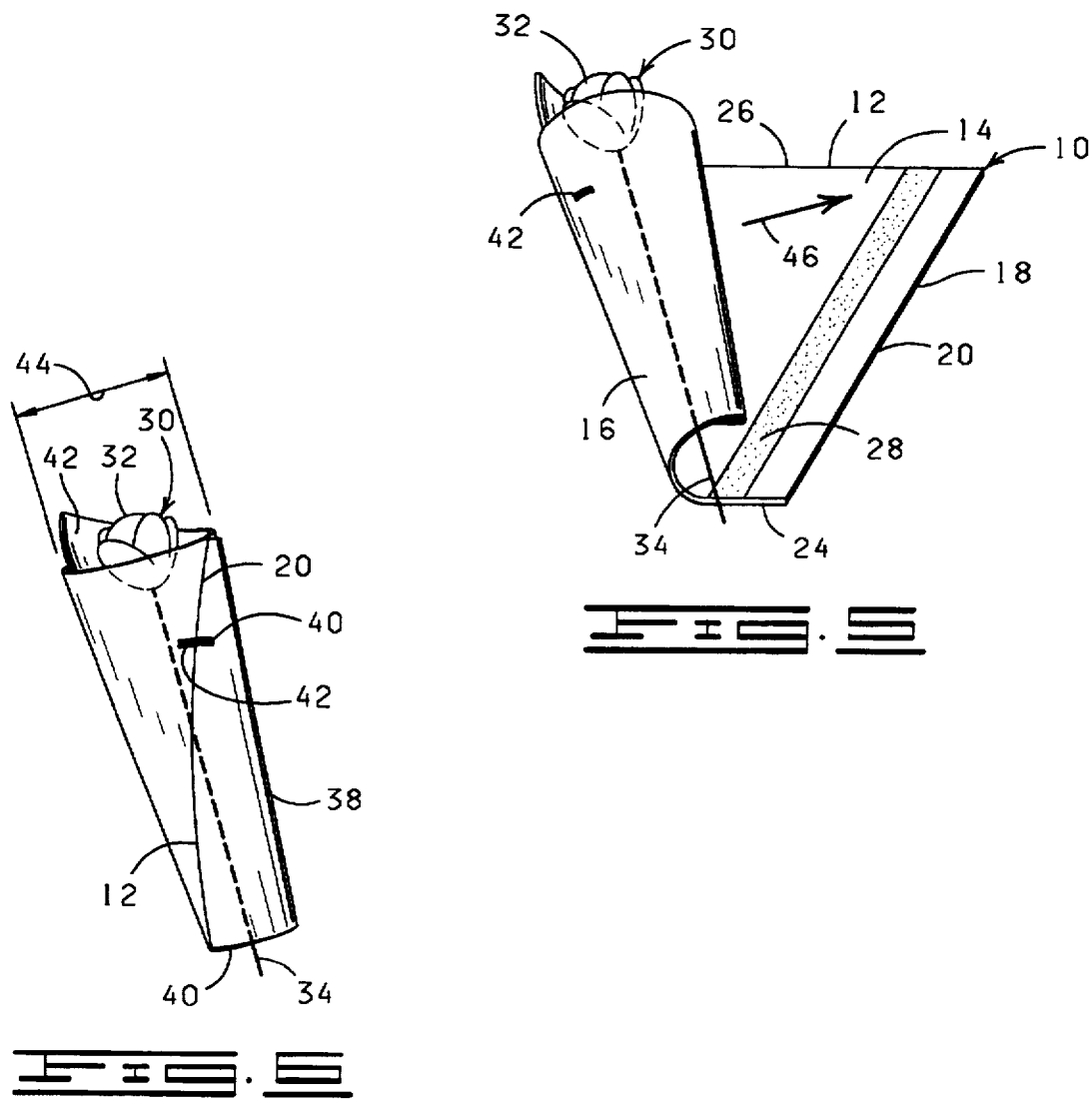

METHOD FOR WRAPPING INDIVIDUAL FLORAL GROUPINGS WITH WRAPPING MATERIAL HAVING SIZING MARKS THEREON

CROSS-REFERENCE TO RELATED APPLICATIONS

This application is a continuation of U.S. Ser. No. 08/239,483, filed May 9, 1994, entitled METHOD FOR WRAPPING INDIVIDUAL FLORAL GROUPINGS WITH WRAPPING MATERIAL HAVING SIZING MARKS THEREON, now U.S. Pat. No. 5,501,060; which is a continuation-in-part of U.S. Ser. No. 08/010,899, filed Jan. 29, 1993, entitled METHOD OF WRAPPING A FLORAL GROUPING USING A MATERIAL HAVING POSITIONING MARKS, now U.S. Pat. No. 5,381,642; which is a continuation-in-part of U.S. Ser. 07/968,798, filed Oct. 30, 1992, entitled METHOD AND APPARATUS FOR COVERING PORTIONS OF AN OBJECT WITH A SHEET OF MATERIAL HAVING PRESSURE SENSITIVE ADHESIVE COATING APPLIED TO AT LEAST ONE SURFACE OF THE SHEET OF MATERIAL, now U.S. Pat. No. 5,369,934; which is a continuation of U.S. Ser. No. 07/865,563, filed Apr. 9, 1992, entitled METHODS FOR WRAPPING A FLORAL GROUPING, now U.S. Pat. No. 5,245,814; which is a continuation of U.S. Ser. No. 07/649,379, filed Jan. 31, 1991, entitled METHOD FOR WRAPPING AN OBJECT WITH A MATERIAL HAVING PRESSURE SENSITIVE ADHESIVE THEREON, now U.S. Pat. No. 5,111,638; which is a continuation of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

Said application 08/010,899 is also a continuation-in-part of U.S. Ser. No. 07/965,585, filed Oct. 23, 1992, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/893,586, filed Jun. 2, 1992, entitled WRAPPING A FLORAL GROUPING WITH SHEETS HAVING ADHESIVE OR COHESIVE MATERIAL APPLIED THERETO, now U.S. Pat. No. 5,181,364; which is a continuation of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No. 07/502,358, filed Mar. 29, 1990, entitled WRAPPING A FLORAL GROUPING WITH SHEETS HAVING ADHESIVE AND COHESIVE MATERIAL APPLIED THERETO, now abandoned; which is a continuation-in-part of U.S. Ser. No. 07/249,761, filed Sep. 26, 1988, entitled METHOD FOR WRAPPING AN OBJECT WITH A MATERIAL HAVING PRESSURE SENSITIVE ADHESIVE THEREON, now abandoned.

FIELD OF THE INVENTION

This invention generally relates to wrapping materials, and, more particularly but not by way of limitation, to methods of wrapping floral groupings so that a wrapper formed about the floral grouping has a predetermined perimeter length about a flower end of the floral grouping.

BRIEF DESCRIPTION OF THE DRAWINGS

FIG. 4 is a perspective view of the sheet of wrapping material of FIGS. 1–3, showing the sheet of material partially wrapped about the floral grouping.

FIG. 5 is a perspective view of the sheet of wrapping material and floral grouping of FIG. 4, showing the sheet of material further wrapped about the floral grouping.

FIG. 6 is a perspective view of the sheet of wrapping material and floral grouping of FIGS. 4–5, showing the sheet of material fully wrapped about the floral grouping.

DESCRIPTION OF THE PREFERRED EMBODIMENTS

Floral groupings are usually wrapped in a wrapping material to protect the floral grouping during shipping or to enhance the aesthetic qualities of the floral grouping. The wrapping material utilized is frequently square or rectangularly shaped and often has some bonding material thereon, such as an adhesive or cohesive, so that the wrapping material retains its wrapped shape and securely encompasses the floral grouping. There are, however, disadvantages to this type of wrapping material.

A significant disadvantage occurs when the wrapping material is wrapped too tightly about the floral grouping. This results in the floral grouping either being damaged by the tight wrapping material, or being compressed to a degree that a flower end of the floral grouping is unsuitable for proper display.

The present invention contemplates a method of wrapping individual floral groupings with a wrapping material which has a bonding material thereon (the bonding material being described in detail below). The wrapping material is separable into sheets which have markings in certain locations on each sheet of material (the markings comprise "sizing marks," which will be described in further detail below), which permit an operator tow rap the sheet of material around the floral grouping whereby the wrapping material forms a wrapper about the floral grouping which has a predetermined perimeter length around the flower end of the floral grouping. When wrapped in this manner, the wrapping material is sufficiently tight to protect the floral grouping, but is not so tight as to damage the floral grouping or result in an appearance that is improper for display of the floral grouping. Therefore, the present invention contemplates a method of wrapping an individual floral grouping with a sheet of wrapping material which acts to enhance, protect and preserve the aesthetic appearance of the floral grouping.

Figure 1:
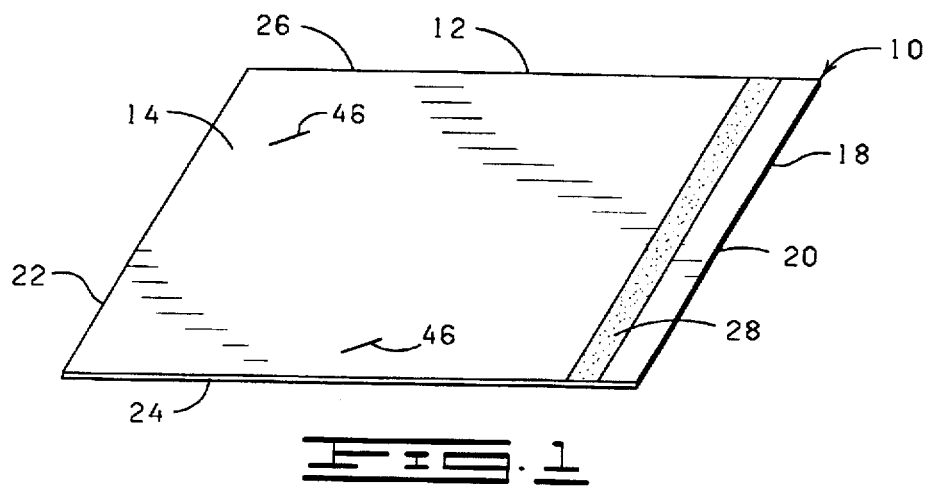
FIG. 1 is a perspective view of a sheet of wrapping material constructed in accordance with the present invention showing an upper surface of the sheet of material, the sheet of material having tick marks and a bonding material disposed near one side thereof.
Figure 2:
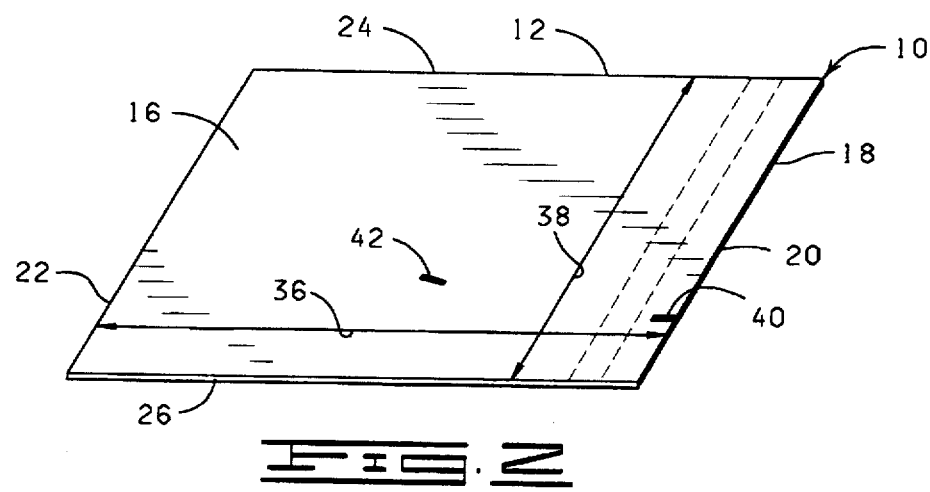
FIG. 2 is a perspective view of the sheet of wrapping material of FIG. 1 showing a lower surface of the sheet of material, the lower surface having sizing marks provided thereon.

Shown in FIGS. 1 and 2, and designated generally by the reference numeral 10, is a wrapping material which is constructed in accordance with the present invention. The wrapping material 10 comprises at least one sheet of material 12. The sheet of material 12 has an upper surface 14, a lower surface 16 (FIG. 2), and an outer periphery 18. The outer periphery 18 of the sheet of material 12 further comprises a first side 20, a second side 22, a third side 24, and a fourth side 26. The sheet of material 12 also has a bonding material 28 disposed thereon, said bonding material 28 described in detail below.

Figure 3:
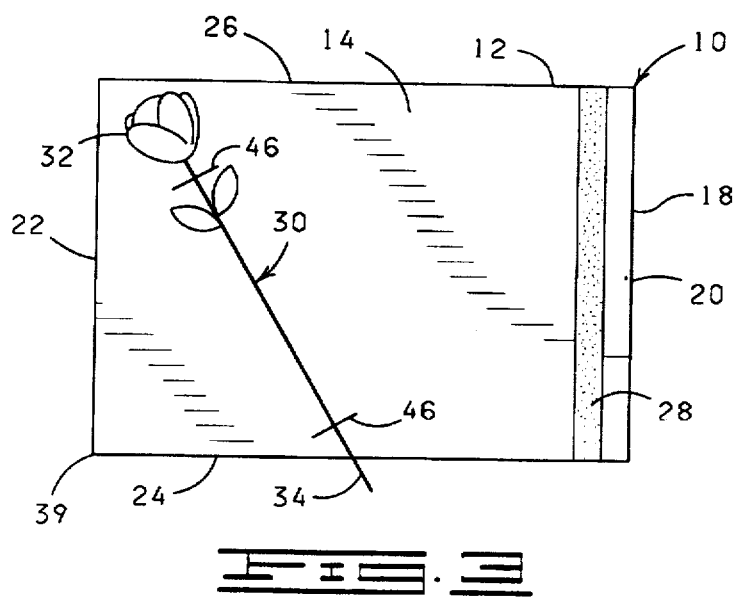
FIG. 3 is a plan view of the sheet of wrapping material of FIGS. 1 and 2, showing a floral grouping disposed thereon.

The sheet of material 12 is utilized to wrap a floral grouping 30 (FIG. 3). "Floral grouping" as used herein means cut fresh flowers, artificial flowers, other fresh and/or artificial plants or other floral materials and may include other secondary plants and/or ornamentation which add to the aesthetics of the overall floral grouping. "Floral grouping" also may refer to a single flower or plant. The floral grouping 30 comprises a flower end 32, which may be either a bloom or a foliage portion, and a stem end 34.

However, it will be appreciated that the floral grouping 30 may consist of only a single bloom or only foliage as illustrated in FIGS. 3–6. The flower end 32 of the floral grouping 30 may comprise one or more blooms, foliage or a combination thereof.

As shown in FIGS. 1–3, the sheet of material 12 is substantially square or rectangularly shaped and substantially flat. It should be understood, however, the sheet of material 12 used to wrap the floral grouping 30 may be provided with 10 any shape or size as long as the sheet of material 12 is sufficiently sized and shaped tow rap and encompass the floral grouping 30 and accomplish the purposes described herein. For example, the sheet of material 12 may also comprise other geometric or non-geometric shapes, including angle cuts such as shown and described in U.S. Ser. No. 08/010.899, filed Jan. 29, 1993, entitled "Wrapping Material Having A Tick Mark And An Angle Cut For Wrapping Individual Flowers or Floral Arrangements" which is expressly incorporated herein by reference.

The sheet of material 12 may be constructed of a single sheet of material 12 or a plurality of sheets of material 12. Any thickness of the sheet of material 12 may be utilized in accordance with the present invention as long as the sheet of material 12 may be wrapped about the floral grouping 30, as described herein. Typically, the sheet of material 12 has a thickness in a range of from about 0.2 mils to about 10 mils. In a preferred embodiment, the sheet of material 12 is constructed from one sheet of man-made organic polymer film having a thickness in a range of from about 0.5 mils to about 2.5 mils.

The sheet of material 12 is constructed from any suitable material that is capable of being wrapped about the floral grouping 30. Preferably, the sheet of material 12 comprises paper (untreated or treated in any manner), cellophane, foil, polymer film, fibre (woven or non-woven or synthetic or natural), cloth (woven or non-woven or knitted or natural or synthetic), burlap, or any combination thereof.

The term "polymer film" as used herein means any polymer film, natural or synthetic. For example, but not by way of limitation, one polymer film is a polypropylene film. Another example of a polymer film, but not by way of limitation, is cellophane. Polymer films are well known in the art, and commercially available.

The sheet of material 12 may vary in color. Further, the sheet of material 12 may consist of designs which are printed, etched, and/or embossed; in addition, the sheet of material 12 may have various colorings, coatings, flockings, and/or metallic finishes, or be characterized totally or partially by pearlescent, translucent, transparent, iridescent, or the like characteristics. Each of the above-named characteristics may occur alone or in combination.

Moreover, each surface of the sheet of material 12 may vary in the combination of such characteristics.

The sheet of material 12 has a width 36 (FIG. 2) extending generally between the first side 20 and the second side 22, respectively, sufficiently sized so that the sheet of material 12 can be wrapped about and substantially surrounded and compass the floral grouping 30. The sheet of material 12 has a length 38 (FIG. 2) extending generally between the third side 24 and the fourth side 26, respectively, sufficiently sized so that the sheet of material 12 extends over a substantial portion of the floral grouping 30 when the sheet of material 12 is wrapped about the floral grouping 30 in accordance with the present invention as shown and described in detail herein.

The sheet of material 12 may further comprise an ink, dye, and/or pigment (not shown). Such inks, dyes, and pigments are known in the art, and are commercially available, and may be disposed upon or incorporated in the sheet of material 12 by any method described herein or known in the art. For example, the ink, dye or pigment may form a portion of a design or decoration on the sheet of material 12. Such a design or decoration may comprise any geometric, nongeometric, or fanciful form, such as flowers, leaves, and the like.

As previously stated, the sheet of material 12 also comprises the bonding material 28. The term "bonding material" as used herein means an adhesive, preferably a pressure sensitive adhesive, a thermal sensitive adhesive, or a cohesive. Where the bonding material 28 is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect a seal. The term "bonding material" as used herein also means a heat sealing lacquer which may be applied to the sheet of material and, in this instance, heat must also be applied to effect sealing. The term "bonding material" as used herein means any type of material or thing which can be used to effect the bonding or connecting the two adjacent portions of the material or the sheet of material 12 as described herein.

The bonding material 28 may comprise varying bonding characteristics when disposed on certain portions of the sheet of material 12. "Varying bonding characteristics" means less adhesion or cohesion of the bonding material 28, that is, less "tack" of the bonding material 28. Therefore, when the bonding material 28 is disposed on a sheet of material, the bonding material 28 may have varying bonding characteristics, that is, less bonding characteristics at or near one portion of the sheet of material 12, for example, near the junction of the first side 20 and the third side 24, than is present along the remainder of the bonding material 28. It will be appreciated that less bonding of the bonding material 28 may be located at any point in the bonding material 28, however.

Further, the bonding material 28 may also comprise at least one color derived from dye, ink, and/or pigment, as previously described herein. Bonding materials 28 as described herein are known in the art and commercially available.

The bonding material 28 is disposed upon the sheet of material 12, preferably on a surface, that is, the upper surface 14, the lower surface 16, or a combination thereof. The bonding material 28 is also preferably disposed near at least one side of the sheet of material 12, such as the first side 20 of the sheet of material 12 and extends in the direction of the second side 22; and the bonding material 18 extends between the third and fourth sides 24 and 26 of the sheet of material 18 substantially as shown. However it will be appreciated that the bonding material 28 may be disposed on any surface or combination of surfaces of the sheet of material 12, or near any side thereof, as long as the placement of the bonding material 28 is consistent with the purposes described herein.

The bonding material 28 may be disposed on the sheet of material 12 by any method known in the art, including, but not by way of limitation, painting it thereupon, spraying it thereupon, brushing it thereupon, and/or lacquering it thereupon. The bonding material 28 as previously described, is preferably a pressure sensitive adhesive. Such use of adhesive, and particularly pressure sensitive adhesives, is taught in U.S. Pat. No. 5,111,638, entitled "Method For Wrapping An Object With A Material Having Pressure Sensitive Adhesive Thereon," which is hereby incorporated by reference herein.

The sheet of material 12 is further provided with a first sizing mark 40 and a second sizing mark 42 disposed on the lower surface 16 thereof (FIGS. 2, 5 and 6). "Sizing mark" means any indicia such as a line, letter, character, symbol, or combination thereof, including one side of the sheet of material 12, such as the second side 22 of the sheet of material 12. The first sizing mark 40 is preferably located along the outer periphery 18 of the sheet of material 12, preferably adjacent to the first side 20 of the sheet of material 12. It should be noted, however, that the first side 20 of the sheet of material 12 may also serve as the first sizing mark 40 without departing from the inventive concept of the present invention. The second sizing mark 42 is inwardly disposed from the first sizing mark 40 at a location wherein, when the sheet of material 12 is wrapped about the floral grouping 30, the second sizing mark 42 may be substantially aligned with the first sizing mark 40. The first and second sizing marks 40 and 42 permit the sheet of material 12 to be wrapped to an optimal perimeter length 44 about the flower end 32 of the floral grouping 30 (FIG. 6) so that the sheet of material 12 is wrapped tightly enough about the floral grouping 30 to protect the floral grouping 30 from damage, but loosely enough to preserve the visual aesthetics of the floral grouping 30.

The location of the second sizing mark 42 may vary depending on the perimeter length 44 desired about the flower end 32 of the floral grouping 30. For example, if the flower end 32 of the floral grouping 30 has a large diameter, then the second sizing mark 42 may be located a greater distance from the first sizing mark 40 than if the flower end 32 of the floral grouping 30 had a smaller diameter. Generally, the greater the distance between the first sizing mark 40 and the second sizing mark 42, the greater the perimeter length 44 about the flower end 32 of the floral grouping 30.

Although the method shown and described above includes the placement of the first and second sizing marks 40 and 42 located on the lower surface 16 of the sheet of material 12, it should be understood that when the sheet of material 12 is transparent or translucent, the first and second sizing marks 40 and 42 may be located on the upper surface 14 of the sheet of material 12 because, in such instance, the first and second sizing marks 40 and 42 would be visible through the sheet of material 12 from the lower surface 16 of the sheet of material 12. Furthermore, when the sheet of material 12 is transparent or translucent, the first sizing mark 40 may be located on the upper surface 14 of the sheet of material 12 and the second sizing mark 42 may be located on the lower surface 16 of the sheet of material 12, or vice versa. Disposition of the first and second sizing marks 40 and 42 on a transparent or translucent material has no effect on the method shown and described herein.

The sheet of material 12 preferably has one or more markings referred to as "tick marks" 46. (Only one marking, that is, "tick mark" is designated as tick mark 46). "Tick mark" means any mark (such as a straight line, curved line, or the like), letter or combination of letters, symbols (such as a flower, bloom, stem, leaves, arrow, geometric shapes, or non-geometric shape), or combinations thereof, which is utilized to indicate precisely where to dispose the floral grouping 30 on the sheet of material 12. Such tick marks 46 permit the floral grouping 30 to be disposed in an optimal position on the sheet of material 12, and also permit the sheet of material 12 to be wrapped about the floral grouping 30 in a manner which renders an attractive wrapping, thus enhancing the aesthetic appeal of the floral grouping 30. The tick marks 46 indicate to an operator where to place the flower end 32 of a floral arrangement 30. The tick marks 46 also indicate to an operator where to place the stem end 34 of the floral grouping 30. When a floral grouping 30 is placed on the sheet of material 12 as indicated by the tick marks 46, and the sheet of material is wrapped about the floral grouping 30 so that the first and second sizing marks 40 and 42 are substantially aligned, the flower end 32 will be wrapped with the sheet of material 12 so that the flower end 32 of the floral grouping 30 is completely, but loosely, surrounded by the sheet of material 12, while the stem end 34 of the floral arrangement 30 will extend a distance away from the sheet of material 12, permitting the stem end to be wetted or immersed in water.

The method of wrapping the floral grouping with at least one sheet of material 12 is illustrated in FIGS. 4–6. The sheet of material 12 is sized to wrap about and substantially surround and encompass the floral grouping 30. The floral grouping 30 is placed on the upper surface 14 of the sheet of material 12 (FIG. 3) using the tick marks 46 as a guide to the placement of the floral grouping 30 on the sheet of material 12 substantially as shown. The tick marks 46 permit the floral grouping 30 to be placed in an optimal position for wrapping, wherein when wrapped, the floral grouping 30 will have an optimal aesthetic appearance.

A first portion of the sheet of material 12 is then lifted and placed over the sheet of material 12 wherein the first portion of the sheet of material 12 overlaps the floral grouping 30 and at least a second portion of the sheet of material 12 (FIG. 4). The sheet of material 12 is then rolled about the floral grouping 30 until the sheet of material 12 substantially encompasses and surrounds a substantial portion of the flower end 32 and the stem end 34 of the floral grouping 30 and the second sizing mark 42 of the sheet of material 12 is substantially aligned with the first sizing mark 40. The perimeter length 44 (FIG. 6) of the sheet of material 12 around the flower end 32 of the floral grouping 30 is thereby sized to a dimension predetermined by the location of the first and second sizing marks 40 and 42 on the sheet of material 12. The overlapping portions of the sheet of material 12 are bonded together by contact with the bonding material 28 on the upper surface 14 of the sheet of material 12 to provide the wrapper 48 (FIG. 6).

The wrapper 48 produced by wrapping at least one sheet of material 12 about the floral grouping 30 may be conically shaped (FIG. 6), cylindrically shaped (not shown) or may comprise other geometric forms (squares, rectangles and the like) or non-geometric or asymmetrical formed wrapping (not shown). The wrapper 48 has an opening extending through a lower end 50 thereof and an opening extending through an upper end 52 thereof with the stem end 34 of the floral grouping 30 extending through the opening in the lower end 50 and the flower end 32 of the floral grouping 30 being exposed near the opening in the upper end 52 thereof. The upper end 52 of the wrapper 48 is preferably loosely wrapped about the flower end 32 of the floral grouping 30; and the wrapper 48 is preferably tightly wrapped about the stem end 34 of the floral grouping 30.

In a more specific method of use, the sheet of material 12 is provided and disposed on a relatively horizontal surface (not shown). The floral grouping 30 also is provided. The floral grouping 30 is disposed on the upper surface 14 of the sheet of material 12 as shown in FIG. 3 and described previously. An operator then lifts a portion of the sheet of material 12 (generally near the juncture of the second side 22 and third side 24) and places the lifted portion over a portion of the floral grouping 30 as shown in FIG. 4.

The sheet of material 12 and the floral grouping 30 are continually rolled in direction 46 generally toward the second side 22 of the sheet of material 12 until the floral grouping 30 is disposed generally adjacent the second side 22 of the sheet of material 12. At this point, the sheet of material 12 has been rolled about the floral grouping 30 to a position wherein the second sizing mark 42 is visible to the operator, as shown in FIG. 5. In this position, the operator continues to roll the sheet of material 12 and the floral grouping 30 disposed thereon in the direction 46 until the second sizing mark 42 is substantially aligned with the first sizing mark 40. With the first and second sizing marks 40 and 42 substantially aligned, the sheet of material 12 is rolled across the bonding material 28 disposed on the upper surface 14 of the sheet of material 12. The lower surface 16 of the sheet of material 12 is thereby bondingly connected to the bonding material 28 on the upper surface 14 of the sheet of material 12 whereby there are substantially no flaps formed by unbonded portions of the sheet of material 12. The sheet of material 12 is thereby secured to itself to securely wrap the floral grouping 30, as shown in FIG. 6.

In wrapping the floral grouping 30 with the sheet of material 12, the configuration of the wrapper 48 will be dependent to a large degree on the position of the first and second sizing marks 40 and 42 on the sheet of material 12, as well as the number of times the sheet of material 12 is wrapped about the floral grouping 30.

Changes may be made in the combination and arrangement of the parts or elements described herein, or in the steps or in the sequence of steps of the methods described herein, without departing from the spirit and/or scope of the invention as defined in the following claims:

What is claimed is:
1. A method for wrapping a floral grouping comprising the steps of:
   providing a sheet of material having a first sizing mark and a sizing mark;
   providing the floral grouping having a flower end and a stem end;
   disposing the floral grouping on the sheet of material; and
   wrapping the sheet of material about the floral grouping to a position wherein the first sizing mark is substantially aligned with the second sizing mark so as to form a wrapper for the floral grouping having an upper end and a lower end, the floral grouping being disposed on the sheet of material and wrapped with the sheet of material whereby the flower end of the floral grouping is disposed near the upper end of the wrapper and the stem end of the floral grouping is disposed near the lower end of the wrapper, the first and second sizing marks being positioned on the sheet of material so that, when the sheet of material is wrapped about the floral grouping to the position wherein the first sizing mark is substantially aligned with the second sizing mark, the upper end of the wrapper has a perimeter length predetermined by alignment of the first and second sizing marks on the sheet of material.

2. The method of claim 1 wherein the step of wrapping the sheet of material about the floral grouping further comprises wrapping the sheet about the floral grouping such that the sheet of material substantially encompasses and surrounds a substantial portion of the flower end of the floral grouping.

3. The method of claim 2 wherein the step of wrapping the sheet of material about the floral grouping further comprises wrapping the sheet of material about the floral grouping such that the sheet of material is loosely wrapped about the flower end of the floral grouping.

4. The method of claim 1 wherein the step of wrapping the sheet of material about the floral grouping further comprises leaving an opening extending through the upper end of the wrapped sheet of material with the flower end of the floral grouping being exposed near the opening in the upper end.

5. The method of claim 4 wherein the step of wrapping the sheet of material about the floral grouping further comprises leaving an opening extending through the lower end of the wrapped sheet of material with the stem end of the floral grouping extending through the opening in the lower end.

* * * * *

UNITED STATES PATENT AND TRADEMARK OFFICE
CERTIFICATE OF CORRECTION

PATENT NO. : 5,673,537
DATED : October 7, 1997
INVENTOR(S) : Donald E. Weder, et al.

It is certified that error appears in the above-identified patent and that said Letters Patent is hereby corrected as shown below:

The title page showing the illustrative figure should be deleted to be replaced with the attached title page.

United States Patent

Weder et al.

[11] Patent Number: 5,673,537
[45] Date of Patent: *Oct. 7, 1997

[54] METHOD FOR WRAPPING INDIVIDUAL FLORAL GROUPINGS WITH WRAPPING MATERIAL HAVING SIZING MARKS THEREON

[75] Inventors: Donald E. Weder; John W. Bergstrand, both of Highland, Ill.

[73] Assignee: Southpac Trust International, Inc., Okla. City, Okla.; not individually, but as trustee of The Family Trust U/T/A dated Dec. 8, 1995, Charles A. Codding, Authorized Signatory for Southpac Trust International Inc., trustee

[*] Notice: The term of this patent shall not extend beyond the expiration date of Pat. No. 5,501,060.

[21] Appl. No.: 465,081

[22] Filed: Jun. 5, 1995

Related U.S. Application Data

[63] Continuation of Ser. No. 239,483, May 9, 1994, Pat. No. 5,501,060, which is a continuation-in-part of Ser. No. 10,899, Jan. 29, 1993, Pat. No. 5,381,642, which is a continuation-in-part of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 10,899, is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned, which is a continuation-in-part of Ser. No. 249,761, Sep. 26, 1988, abandoned.

[51] Int. Cl.⁶ .................... B65B 11/04; B65B 11/48; B65B 25/02
[52] U.S. Cl. .................... 53/399; 53/411; 53/465; 47/72; 229/87.01
[58] Field of Search .................... 53/399, 397, 462, 53/465, 466, 411, 51; 229/87.01; 47/72; 428/317.1

[56] References Cited

U.S. PATENT DOCUMENTS

| | | | |
|---|---|---|---|
| 1,525,015 | 2/1925 | Weeks | 53/465 X |
| 2,170,147 | 8/1939 | Lane | 53/399 X |
| 2,340,373 | 2/1944 | Gardner | 47/72 X |
| 3,027,263 | 3/1962 | Wanamaker | 53/465 |
| 3,271,922 | 9/1966 | Wallerstein et al. | |
| 3,508,372 | 4/1970 | Wallerstein et al. | |
| 4,989,396 | 2/1991 | Weder et al. | 53/465 X |
| 5,007,229 | 4/1991 | Weder et al. | 53/462 X |
| 5,111,637 | 5/1992 | Weder et al. | 53/397 |
| 5,181,364 | 1/1993 | Weder | 53/465 X |
| 5,239,804 | 8/1993 | Weder et al. | 53/465 X |
| 5,245,814 | 9/1993 | Weder | 53/462 X |
| 5,307,605 | 5/1994 | Straeter | 53/397 |
| 5,335,476 | 8/1994 | Weder | 53/399 X |
| 5,381,642 | 1/1995 | Weder et al. | 53/465 X |
| 5,448,875 | 9/1995 | Weder | 53/397 |
| 5,501,060 | 3/1996 | Weder et al. | 53/399 |

*Primary Examiner*—Horace M. Culver
*Attorney, Agent, or Firm*—Dunlap & Codding, P.C.

[57] ABSTRACT

A method for wrapping a wrapping material having sizing marks thereon about a floral grouping to form a wrapper about the floral grouping, the wrapper having a perimeter length about a bloom portion of the floral grouping which is predetermined by the position of the sizing marks. The sheet of material has a bonding material disposed thereupon so that the wrapping material retains its shape and substantially surrounds and encompasses the floral grouping.

5 Claims, 2 Drawing Sheets

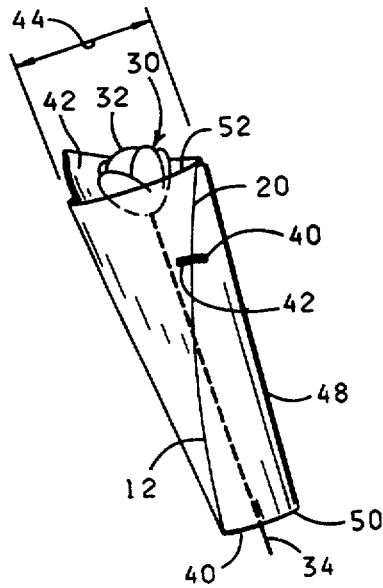

UNITED STATES PATENT AND TRADEMARK OFFICE
CERTIFICATE OF CORRECTION

PATENT NO.    :   5,673,537                    Page 3 of 6

DATED         :   October 7, 1997

INVENTOR(S)   :   Weder et al.

It is certified that error appears in the above-identified patent and that said Letters Patent is hereby corrected as shown below:

```
Sheet 2 of 2, FIG. 4, please delete the drawing element "46"
for direction, and substitute therefor --54--, as illustrated
in FIG. 4 below.
```

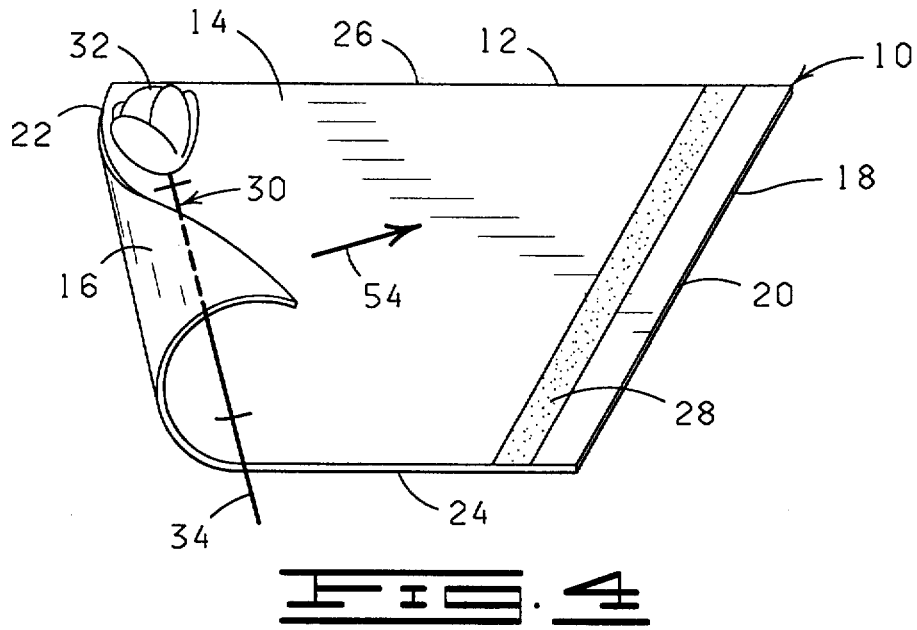

UNITED STATES PATENT AND TRADEMARK OFFICE
CERTIFICATE OF CORRECTION

PATENT NO. : 5,673,537

DATED : October 7, 1997

INVENTOR(S) : Weder et al.

It is certified that error appears in the above-identified patent and that said Letters Patent is hereby corrected as shown below:

Sheet 2 of 2, FIG. 5, please delete drawing element "46" for direction, and substitute therefor --54--, as illustrated in FIG. 5 below.

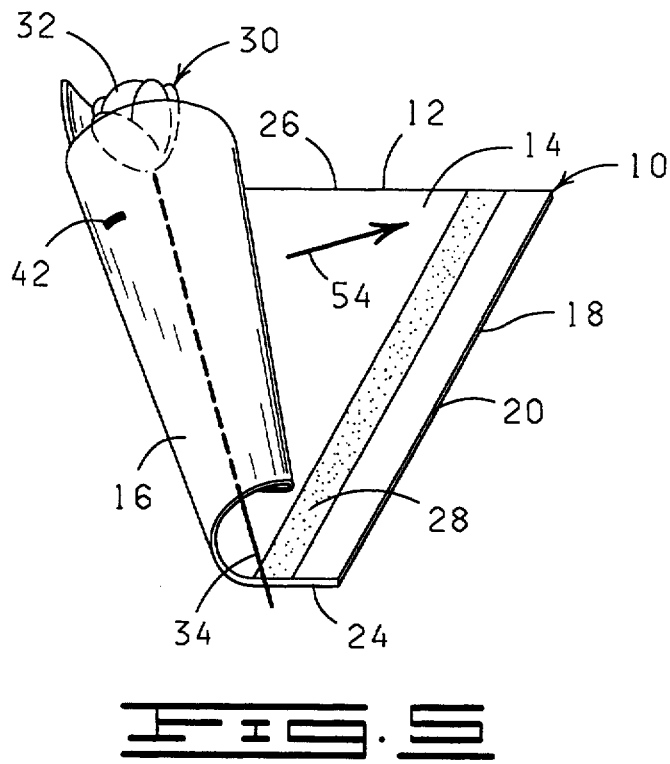

FIG. 5

UNITED STATES PATENT AND TRADEMARK OFFICE
CERTIFICATE OF CORRECTION

PATENT NO.     :   5,673,537                              Page 5 of 6
DATED          :   November 4, 1997
INVENTOR(S)    :   Weder et al.

It is certified that error appears in the above-identified patent and that said Letters Patent is hereby corrected as shown below:

Sheet 2 of 2, FIG. 6, please delete drawing element "38", and substitute therefor --48--, as illustrated in FIG. 6 below.

Sheet 2 of 2, FIG. 6, please insert drawing elements --50--, and --52--, as illustrated in FIG. 6 below.

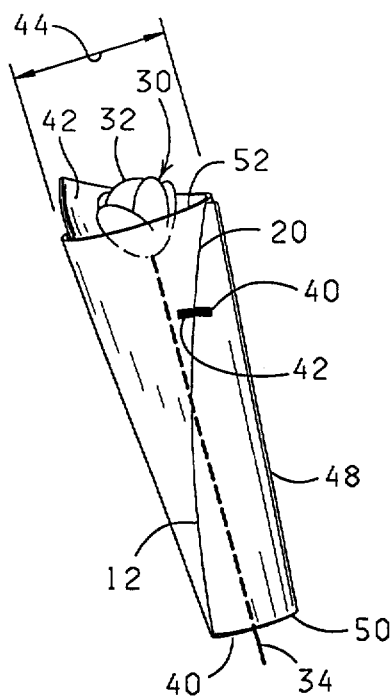

UNITED STATES PATENT AND TRADEMARK OFFICE
CERTIFICATE OF CORRECTION

PATENT NO.    :    5,673,537

DATED         :    October 7, 1997

INVENTOR(S)   :    Weder et al.

It is certified that error appears in the above-identified patent and that said Letters Patent is hereby corrected as shown below:

Column 2, line 45, please delete "tow rap", and substitute therefor --to wrap--.

Column 3, line 20, please delete "tow rap", and substitute therefor --to wrap--.

Column 4, line 64, after 'bonding material', please delete "18", and substitute therefor --28--.

Column 4, line 66, please delete "18", and substitute therefor --12--.

Column 7, line 17, after 'direction', please delete "46", and substitute therefor --54--.

Column 7, line 25, after 'direction', please delete "46", and substitute therefor --54--.

Signed and Sealed this

Twelfth Day of May, 1998

BRUCE LEHMAN

Attest:

Attesting Officer

Commissioner of Patents and Trademarks